US012621555B2

(12) United States Patent
Müller et al.

(10) Patent No.: US 12,621,555 B2
(45) Date of Patent: May 5, 2026

(54) CAMERA AND METHOD FOR RECOGNIZING FLASHES

(71) Applicant: SICK AG, Waldkirch (DE)

(72) Inventors: Romain Müller, Waldkirch (DE); Dirk Strohmeier, Waldkirch (DE); Tijl Schwartzkopff, Waldkirch (DE)

(73) Assignee: SICK AG, Waldkirch (DE)

( * ) Notice: Subject to any disclaimer, the term of this patent is extended or adjusted under 35 U.S.C. 154(b) by 63 days.

(21) Appl. No.: 18/372,858

(22) Filed: Sep. 26, 2023

(65) Prior Publication Data

US 2024/0107149 A1 Mar. 28, 2024

(30) Foreign Application Priority Data

Sep. 27, 2022 (EP) ...................................... 22198118

(51) Int. Cl.
| | |
|---|---|
| *H04N 23/61* | (2023.01) |
| *H04N 23/12* | (2023.01) |
| *H04N 23/66* | (2023.01) |
| *H04N 25/40* | (2023.01) |
| *H04N 25/47* | (2023.01) |

(52) U.S. Cl.
CPC ............. *H04N 23/61* (2023.01); *H04N 23/12* (2023.01); *H04N 23/66* (2023.01); *H04N 25/40* (2023.01); *H04N 25/47* (2023.01)

(58) Field of Classification Search
CPC ........ H04N 23/12; H04N 23/60; H04N 23/61; H04N 23/66; H04N 25/40; H04N 25/47
See application file for complete search history.

(56) References Cited

U.S. PATENT DOCUMENTS

| | | | |
|---|---|---|---|
| 7,796,168 B1* | 9/2010 | Kostrzewa | ............. H04N 23/81 |
| | | | 348/241 |
| 9,910,082 B2 | 3/2018 | Stolper et al. | |
| 2007/0125951 A1* | 6/2007 | Snider | .................... H04N 23/11 |
| | | | 348/E5.037 |
| 2013/0335595 A1 | 12/2013 | Lee et al. | |

(Continued)

FOREIGN PATENT DOCUMENTS

| | | |
|---|---|---|
| CN | 114140656 A | 3/2022 |
| DE | 102013106514 B3 | 10/2014 |

(Continued)

OTHER PUBLICATIONS

Gallego, et al.; "A Unifying Contrast Maximization Framework for Event Cameras, with Applications to Motion, Depth, and Optical Flow Estimation"; IEEE Conference on Computer Vision and Pattern Recognition (CVPR), Salt Lake City, 2018.

(Continued)

*Primary Examiner* — Antoinette T Spinks
(74) *Attorney, Agent, or Firm* — Nath, Goldberg & Meyer; Jerald L. Meyer

(57) ABSTRACT

A camera is provided for recognizing flashes that has an image sensor having a plurality of pixel elements for generating image information and a control and evaluation unit that is configured to read and evaluate image information from the image sensor as to whether a flash has been detected with the image information. In this respect, the image sensor is an event-based image sensor and the control and evaluation unit is configured to read and evaluate events as image information.

18 Claims, 3 Drawing Sheets

(56) References Cited

U.S. PATENT DOCUMENTS

Figure 1:
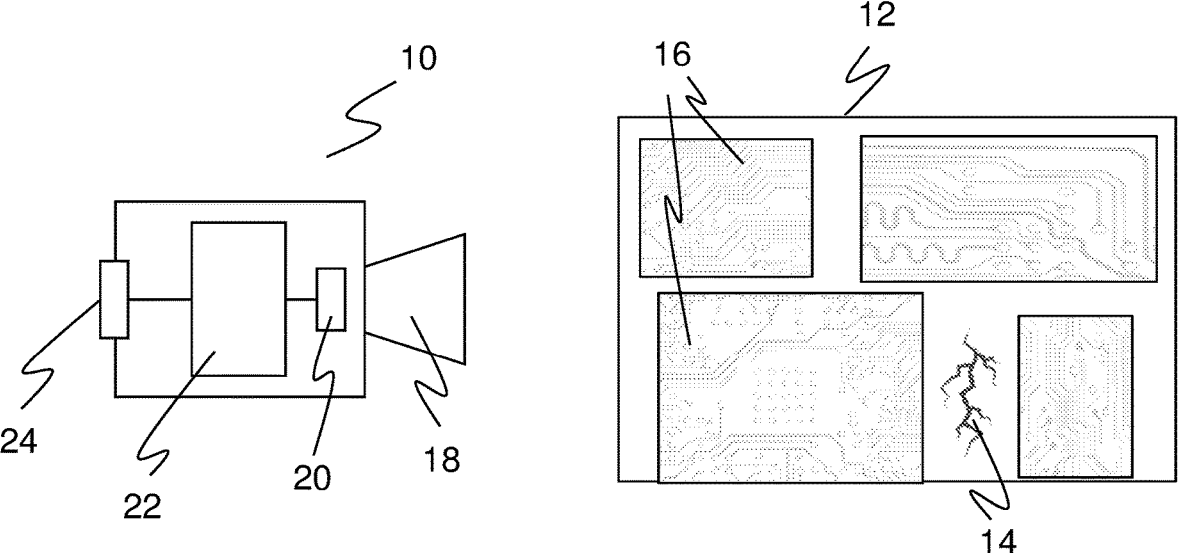

| | | | |
|---|---|---|---|
| 2015/0242702 A1* | 8/2015 | Aphek | G06V 20/52 |
| | | | 382/113 |
| 2019/0197715 A1* | 6/2019 | Rebecq | G06T 7/74 |
| 2021/0044744 A1* | 2/2021 | Sironi | H04N 23/57 |
| 2022/0166944 A1* | 5/2022 | Lagorce | G06V 20/64 |
| 2024/0139907 A1* | 5/2024 | Higashisaka | B24B 53/00 |

FOREIGN PATENT DOCUMENTS

| | | | |
|---|---|---|---|
| DE | 102020205637 A1 | 11/2021 |
| EP | 2574511 A1 | 4/2013 |
| EP | 3663963 A1 | 6/2020 |
| WO | 2015036592 A1 | 3/2015 |
| WO | 2017174579 A1 | 10/2017 |
| WO | 2018037079 A1 | 3/2018 |
| WO | 2018073379 A | 4/2018 |
| WO | 2022181098 A1 | 9/2022 |

OTHER PUBLICATIONS

Park, et al., "Low-Power, Bio-Inspired Time-Stamp-Based 2-D Optio Flow Sensor for Artificial Compound Eyes of Micro Air Vehicles", IEEE Sensors Journal, vol. 19, No. 24, Dec. 15, 2019.

* cited by examiner

Time [μs]

Time [μs]

Time [μs]

CAMERA AND METHOD FOR RECOGNIZING FLASHES

The invention relates to a camera and to a method for recognizing flashes in accordance with the preambles of claim 1 and claim 13 respectively.

The recognition of small or larger flashes is a challenge. A flash is here in precise terms not to be understood primarily as a flash of lightning, but rather as a spark discharge such as occurs on a short circuit on a circuit board or generally on a monitored machine. The application case can be a quality inspection or a control monitoring or a timely warning of a risk of fire.

Purely optically, a flash means a very brief, very bright, and as a rule locally restricted lighting up between two conductors having an admittedly roughly linear geometry, but one that is unpredictable and rapidly variable in its details. Conventional camera technology is not suitable for the detection of flashes. Due to their very short duration, it is likely that the flashes occur between two shots or frames and are thus overlooked from the start. Working with a correspondingly extended exposure time is not a solution. The flashes may thereby possibly be captured, but the images will be overexposed by other interference effects so that the flashes still remain unrecognizable.

U.S. Pat. No. 9,910,082 B2 deals with a device for measuring and detecting electrical discharges. Calibration data on discharges of different strengths are stored in advance here. Camera recordings of discharges are thus evaluated. The document does not look at the problem that the flashes cannot be seen at all in the recordings due to a restricted frame rate.

DE 10 2013 106 514 B3 describes a device for safeguarding a machine working in an automated manner in which a camera system delivers camera images of a protected zone that is evaluated for foreign objects. In addition, an analysis of the camera images takes place as to whether a foreign object is a welding spark. Such welding sparks are, however, not an example of a spark discharge or of a flash since it is not a purely electrical phenomenon, but rather a glowing particle, typically within a whole swarm of such particles. Much slower time scales are thus relevant with which conventional cameras deal well.

More recently, an innovative camera technique has arisen, the so-called event-based camera. It is also called a neuro-morphological camera on the basis of the visual cortex. A conventional camera exposes all of its pixels at a regular frame rate or frame repetition rate and then simultaneously reads them in order thus to acquire a number of stationary two-dimensional images per observed timer period corresponding to the frame rate. There is likewise a matrix of pixels in an event-based camera, but neither a fixed frame rate nor a common reading of pixels. Instead, each pixel individually checks whether it has determined a change in intensity. Image information is only generated and output or read in this case, and indeed only by this pixel. Each pixel is thus a kind of independent motion detector. A detected movement is individually reported as an event. The event-based camera thereby reacts extremely quickly to the dynamics in the scene. Images generated from the events cannot be as intuitively grasped by the human eye because the static image portions are missing An event-based camera is, for example, described in a white paper by Prophesee that can be downloaded from their internet site. Respective pixel circuits for an event-based camera are known from WO 2015/036592 A1, WO 2017/174579 A1, and WO 2018/073379 A1.

The paper by Gallego, Guillermo, Henri Rebecq, and Davide Scaramuzza, "A unifying contrast maximization framework for event cameras, with applications to motion, depth, and optical flow estimation", IEEE Int. Conf. Comput. Vis. Pattern Recog. (CVPR), Vol. 1. 2018 presents methods on how movement, distances, and optical flow can be determined from the data of an event-based camera.

US 2013/0335595 A1 discloses an apparatus and a method for event-based image processing, specifically for determining the optical flow that is, as already mentioned, however, a particularly complex and expensive tool.

An event-based camera for code reading is used in EP 3 663 963 A1.

Even though some reference literature has been named, it is nothing in comparison with the abundance of documents on conventional cameras. Event-based cameras are still little used in practice overall and if they are, then primarily due to their intrinsic movement recognition. The use of an event-based camera has never been considered for flash recognition and nor is movement any suitable description plane for the recognition of flashes.

It is therefore the object of the invention to provide a camera having an improved flash recognition.

This object is satisfied by a camera and by a method for recognizing flashed in accordance with claim 1 and claim 13 respectively. As already initially mentioned, the term flash stands as a representative of an electrical charge, spark discharge, or a brief arc that is optically expressed in a very abruptly occurring light of great brightness that disappears again. The flash is typically locally restricted with a real expansion only in one dimension on the propagation path from one conductor to another conductor. Flashes occur at points that appear to be random, for even if a short circuit or sparkover is objectively most likely at certain points, these points are typically not known in advance. Experience has shown that the weather phenomenon, that is lightning, is also detectable, but due to short circuits, static discharges, and the like at objects such as semiconductors, components, or machines flashes are preferably recognized.

An image sensor with a plurality of pixel elements, preferably arranged at at least one line or matrix, generates image information on the scene that is to be monitored for flashes. Conventionally, such image information is gray scale images or color images; in accordance with the invention, it is different image information that will be described in more detail presently. A control and evaluation unit is connected to the image sensor, reads the image information, and recognized by data processing whether a flash has been detected.

The invention starts from the basic idea of using an event-based image sensor as the image sensor. The camera is therefore an event-based camera instead of a conventional camera having a conventional image sensor. The differences were briefly discussed in the introduction. The pixels respectively recognize changes in the intensity instead of simply measuring the respective intensity. Such a change that should preferably be fast enough and should exceed a noise level is one of the eponymous events. In addition, signals are only provided or read on such a change in the intensity, and indeed only of the respective pixel or the respective pixels. The name event-based image sensor stands for the detection principle independently of other conceivable names such as a neuromorphological image sensor.

The control and evaluation unit reads the events instead of conventional images. The originally detected image information of the image sensor are thus the events and, accordingly, flashes are recognized by evaluating the events.

The invention has the advantage that flashes are reliably recognized. A new area of application is thus opened up that was not able to be serviced to date or at least not satisfactorily using camera technology. An event-based image sensor is fast enough to detect the flashes due to its special functional principle. There is no actual frame rate and the response time of the pixel elements is typically below the duration of a flash, quite unlike the typical frame rate of a conventional camera. At the same time, the image information remains restricted to events. If conventional images were to be recorded at a frame rate that is high enough to detect flashes, this would not only be opposed by the prohibitive costs for the camera. Huge amounts of data would also be produced that would hardly be transferrable and evaluable, at least in real time, and would anyway require further costs for very powerful processing modules. The events relating to a flash, in contrast, correspond to data quantities whose evaluation is even less demanding than the image processing of conventional images, even with a moderate frame rate not sufficient for flashes. If a still scene is observed, the flashes are thus namely the only triggers for events, in addition to noise; the still background is completely ignored by the event-based image sensor.

The control and evaluation unit is preferably configured to recognize a flash as a minimum number of events within a maximum time, in particular a minimum number of local events. Flashes only occur over very brief time scales and only events within a very brief maximum time are therefore considered as belonging to the same flash. The maximum time for this in particular amounts to at most 10 ms, at most some milliseconds, at most 1 ms, at most some hundred microseconds, at most 100 μs, or even less. A flash is furthermore typically local, thus restricted to a small image zone that at most makes up 50%, 25%, 10%, or 5% of the pixel elements and thus of the field of view (FOV) of the camera. A minimum number of events should be observed to distinguish a flash from noise.

The control and evaluation unit is preferably configured to evaluate the events itself without assembling an image therefrom. The evaluation thus remains fully on the level of events. There is at no time anything that corresponds to a conventional image, that is a kind of matrix, that would be perceived as a view of the monitored scene directly on a display unit. It can be stated as a defining difference that the order in an image is predefined by the position of the pixel elements. The events are in contrast, for example, represented in a list independently thereof, with there being no direct relationship between the location of the storage of the event and the position of the pixel element in which the event was generated. Since an image is not generated at all, only quite considerably smaller data quantities are to be transmitted and evaluated. Most pixel elements do not generate any event at almost all times. This even applies to the anyway already rare times at which a flash actually occurred. Conventionally, empty image hones would thereby occur that also have to be transmitted and evaluated. In accordance with this preferred embodiment, such empty image hones are not represented at all and therefore also do not have to be processed.

Even if the flash recognition thus does not require any images, it remains conceivable to assemble an image, but then for an additional different evaluation or for example for a visualization of the flash. In another respect, even an image assembled from events for the flash recognition would remain thinly populated, the data flow between the image sensor and the control and evaluation unit would remain very small, and a skilled evaluation could utilize the thin population. A conventional high speed camera, even if it achieved the required frame rate, would not have any opportunity to recognize and exclude the data quantities for the empty image zones in a timely manner and would therefore either be too slow from the start or would no longer be real time capable with a sufficient frame rate due to the flood of data.

The image sensor preferably generates image information at an update frequency of at least one KHz or even at least ten KHz. The update frequency of a conventional camera is the frame repetition rate or frame rate. Such a common frame rate is unknown to the event-based camera since the pixel elements output or refresh their image information individually and on an event basis. However, there are extremely short response times here which would only be able to be achieved with a conventional camera at huge costs with a thousand or more images per second; with an update frequency still possible with an event-based camera, this would no longer be reproducible technically with a conventional camera. The update frequency corresponds to the maximum time introduced above, but is not necessarily to be considered the same. The events are preferably respectively read cyclically after a time dt. The time resolution of the event could, however, be even finer, for example by a time stamp. Conversely, every readout cycle does not have to be followed by an evaluation cycle, in particular evaluation cycles can respectively only take place after a time k*dt with a small natural number k. Ultimately only the time resolution of the pixel elements is decisive for the flash recognition, i.e. events have to be detected there that are as brief as the duration of a flash. It is not even important here that the flash has been detected with a time precision corresponding to its duration, but rather that the flash triggers events with its brief duration, optionally even with a delay, which then only has the result that a time is associated with the flash that is a little later while the usually important result that there had been a flash, remains unimpaired by a delay. The time dt is in particular sufficient or, if the pixel element allocates even finer time stamps, even a fraction thereof to detect the flash. Since a flash only occurs rarely, most reading and evaluation cycles are very simple since they deal with empty event lists or only a few noise events.

A respective pixel element preferably determines when the intensity detected by the pixel element changes and generates an event exactly then. In other words, this again expresses the special behavior of the pixel elements of an event-based camera or of an event-based image sensor that has already been addressed multiple times. The pixel element checks whether the detected intensity changes. Only that is an event and image information is only output or read on an event. A type of hysteresis is conceivable in which the pixel element still ignores a defined change of the intensity that is still too small and does not consider it an event.

The pixel element preferably delivers differential information as to whether the intensity has decreased or increased as the image information. Image information read out of the pixel element is therefore, for example, a polarity a sign +1 or −1 depending on the direction of change of the intensity. A threshold for intensity changes can be set here at which the pixel element still does not trigger an event. The duration of an intensity change can also play a role in that, for example, the comparison value for the threshold is tracked with a certain decay time. Too slow a change then does not trigger an event even if the intensity change was above the threshold in sum over a time window longer with respect to the decay time.

An integrating variant is also conceivable in principle as an alternative to a differential event-based image sensor. The pixel element then delivers an integrated intensity as the image information in a time window determined by a change of the intensity. The information is here not restricted to a direction of the change of intensity, but the incident light is integrated in a time window fixed by the event and a gray value is thereby determined. The measured value thus corresponds to that of a conventional camera, but the point in time of the detection remains event-based and coupled to a change of intensity. The differential variant is more suitable for an flash recognition since the degree of the intensity change is less important or this extent can be expressed in the threshold for the triggering of an event.

An event preferably has respective coordinate information of the associated pixel element, time information, and/or intensity information. A conventional data stream of an image sensor comprises the intensity values or gray values of the pixels and the spatial reference in the image sensor plane is produced in that all the pixels are read in an ordered sequence. In the event-based image sensor, data tuples per event are instead preferably output that make the event associable. In this respect, the location of the associated pixel element such as its X-Y position on the image sensor, the polarity, or the direction ±1 of the intensity change or the intensity measured at the event, and/or a time stamp are preferably recorded. Only very few data thereby have to be read despite the high effective frame rate, very particularly when the monitored scene remains unchanged.

The pixel elements are preferably formed or configured such that an event is only generated at a high contrast difference corresponding to a flash. The threshold for the triggering of an event in the pixel elements is set to insensitive here. A little noise or a normal contrast change due to small movements and the like in the scenery then does not trigger any events. It is additionally conceivable that the contrast difference has to occur within a small time window corresponding to the maximum time named multiple times, that is slow intensity changes do not have to be considered. This is possible, for example, in that the threshold comparison only goes back by the maximum time. Only the abrupt huge difference between the background and the bright illumination of the flash is sufficient for an event. The pixel elements thus already act as a flash detector even within a certain framework.

The control and evaluation unit is preferably configured only to further evaluate event of increasing intensity. The evaluation thus uses an optional filter according to which only event corresponding to the arising flash and no longer the decaying flash are further considered. This can be called a polarity filter that only transmits events of the polarity +1 with an increasing intensity and eliminates events at the polarity −1 with a decreasing intensity.

The control and evaluation unit is preferably configured to discard spatially isolated events, with an event being spatially isolated when too few further event occur, in particular no further event at all, in a neighborhood of the event during a maximum time. This further optional preparatory evaluation step can be understood as a single event filter against binary noise by which spatially isolated events are eliminated that are due to noise and not to a flash. In a further sense, isolated means that there are at best very few further events in the neighborhood, fewer than on the occurrence of a flash; and, preferably, isolated is understood in a narrower sense in which no further events at all occur in the neighborhood. It is here a question of simultaneous events, with a tolerance simultaneously being present that is preferably defined over the expected duration of a flash that in turn corresponds to the maximum time already addressed multiple times. The neighborhood corresponds to a small image zone in the environment of the respective observed event, for example a neighborhood 4 of the direct neighboring pixel, a neighborhood 8 that also includes diagonal neighbors, or somewhat more generally the pixels at a spacing 1 . . . n, measured in the standard 1 or 2 . . . m measured in the norm 2, for a small natural n, m. It must again be emphasized that preferably no filter kernels operate on an image since an image was preferably not generated at all. It is rather the case that a search for such events whose position satisfies said neighborhood relationship is preferably made in a list or another representation different from an image.

The control and evaluation unit is preferably configured to compare a number of events occurring during a maximum time with a threshold value and to recognize a flash on an exceeding of the threshold value. The maximum time corresponds, as now mentioned several times, to the expected duration of a flash and it can correspond to one or more reading cycles. If a sufficient number of events occur in this time window, this is evaluated as an occurrence of a flash. Fewer events than the threshold value are thus still considered as noise. This evaluation is extremely simple and easy to carry out in real time. If the event are represented as a list, the number can be directly derived from the length of the list. Events are preferably filtered beforehand that cannot be associated with a flash, in particular with a negative polarity or single events as described above. It is conceivable to output the number during a maximum time of occurring events as a measure for how strong the flash was or how close a procedure not evaluated as a flash came to the threshold value. This is in particular of value for a diagnosis and configuration of the flash recognition.

The control and evaluation unit is preferably configured to only associate events within a partial zone of a detection zone of the camera with a possible recognized flash. This is a spatial criterion based on the assumption that a flash remains local, the events triggered by a flash thus form a cluster. The distinguishing between noise or other negligible triggers and a flash can thus be further fine honed. The condition is greater than the condition already discussed above that events associated with a flash only relate to some of the pixel elements since now a geometrical condition is also required. A large number of processes are already known per se with which a check can be made whether positions in a field of view can be sensibly combined to a cluster or not.

The control and evaluation unit is preferably configured to determine a location of the flash from the events in which a flash is recognized, in particular as a mean value, an envelope, or a point cloud of the positions of the pixel elements corresponding to the events. Once a flash has been recognized, its location can additionally be determined. For this purpose, the position information of the contributing events that correspond to the positions, for example as X and Y coordinates, of the pixel elements triggering these events are suitably combined. One possibility for this is to form a mean value or a focus. An envelope can equally be found or, in particular in the case of a visualization, the positions of the contributing events can be determined as a point cloud. In all these combinations, outliers are preferably eliminated in advance using statistical processes known per se.

The method in accordance with the invention can be further developed in a similar manner and shows similar advantages in so doing. Such advantageous features are described in an exemplary, but not exclusive manner in the subordinate claims dependent on the independent claims.

Figure 2:
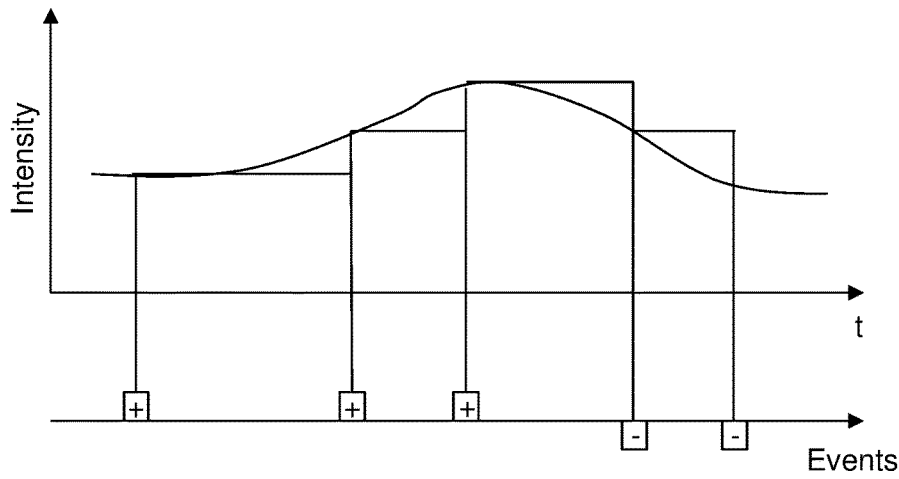
Figure 3:
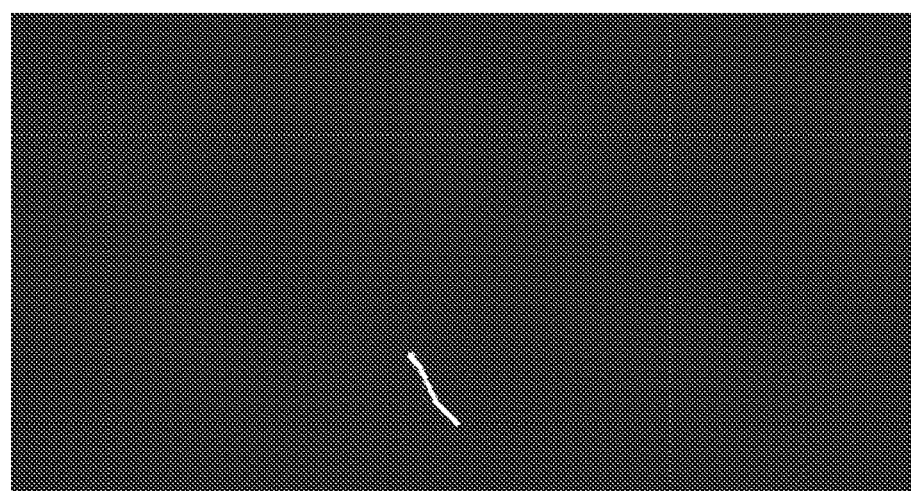
Figure 4:
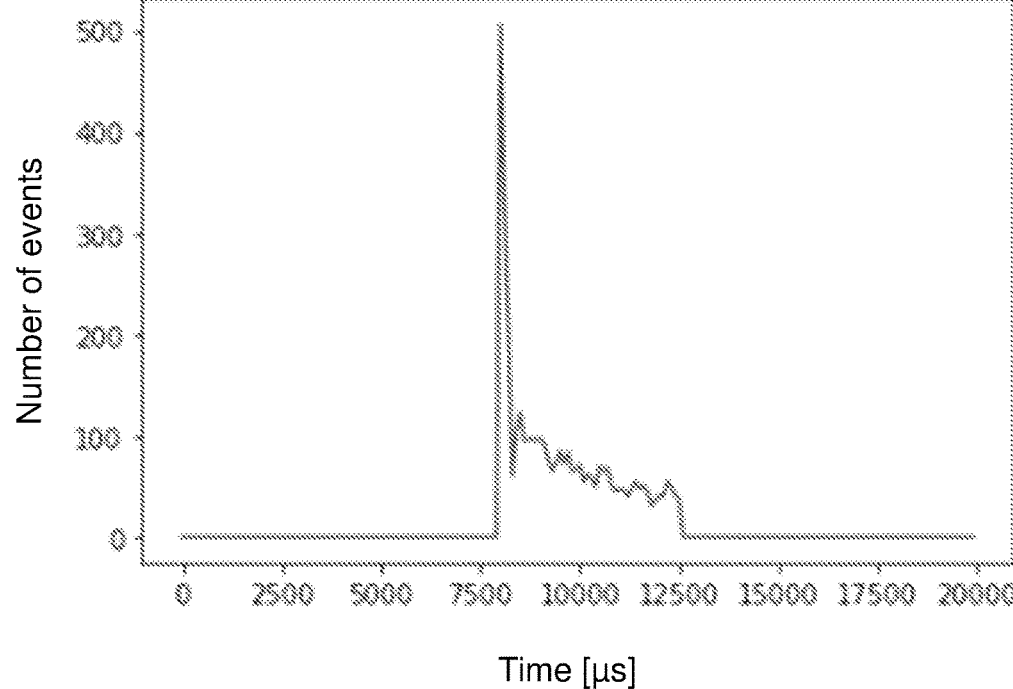
Figure 5:
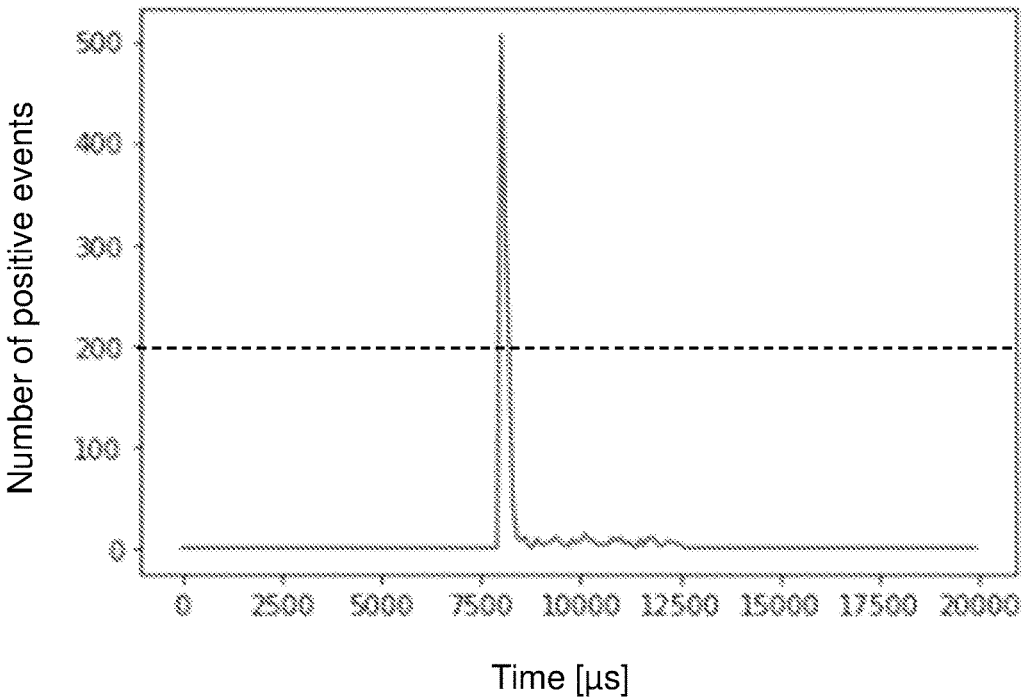
Figure 6:
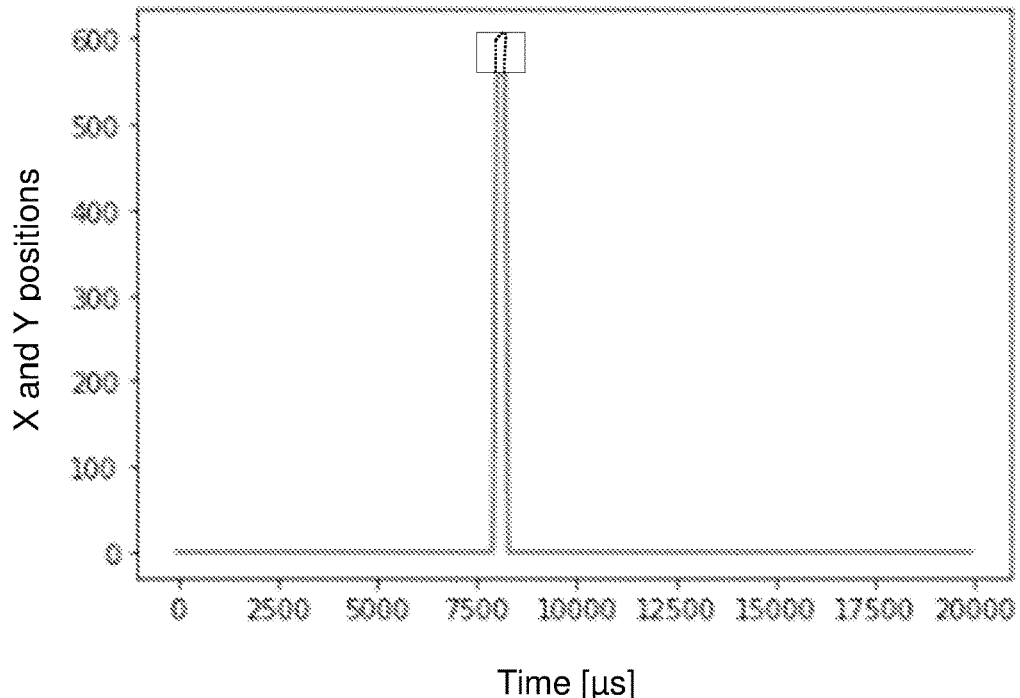

The invention will be explained in more detail in the following also with respect to further features and advantages by way of example with reference to embodiments and to the enclosed drawing. The Figures of the drawing show in:

FIG. 1 a schematic representation of a camera and a scene monitored thereby in which flashes should be recognized;

FIG. 2 an exemplary intensity distribution of a pixel for explaining an event-based detection of image information;

FIG. 3 an exemplary image of a flash recorded by an event-based image sensor;

FIG. 4 an exemplary representation of the number of events in dependence on the time over a phase with a flash;

FIG. 5 a representation in accordance with FIG. 4 after elimination of the events with negative polarity, that is decreasing intensity, of the flash that is disappearing again; and FIG. 6 a representation of the X and Y positions of a recognized flash in dependence on time.

FIG. 1 shows a schematic representation of a camera 10 and of a scene monitored thereby in which flashes 14 should be recognized. Such flashes 14 in particular arise as a short circuit or flashover within or between electronic components 16. The scene 12 is to be understood purely as an example; it is only of importance for the invention that flashes 14 can occur therein.

The camera 10 detects the scene 12 via an objective 18 shown purely symbolically having an image sensor 20. The detection with the image sensor 20 is not fixed to a specific objective 18 and a specific camera design. The image sensor 20 is an event-based image sensor as introduced in the introduction and further explained below with reference to FIG. 2. The image sensor 20 as a rule comprises a matrix arrangement or row arrangement of pixels.

A control and evaluation circuit 22 is connected to the image sensor 20 that reads and further processes its image information. The control and evaluation unit 24 has at least one digital processing module such as at least one microprocessor, at least one FPGA (field programmable gate array), at least one DSP (digital signal processor), at least one ASIC (application specific integrated circuit), at least one VPU (video processing unit), or at least one neural processor. The control and evaluation unit 22 can moreover be provided, differently than shown, at least partly externally to the camera 10, for instance in a superior control, a connected network, an edge device, or a cloud. The process implemented in the control and evaluation unit 22 for flash recognition from the image information of the image sensor 20 will be explained in more detail below with reference to FIGS. 3 to 6.

The camera 10 outputs information via an interface 24. In the case of an at least partly externally implemented flash recognition, they can be events of the image sensor 20 and generally results or partial results of the flash recognition. Conversely, provision can be made to address the camera 10 via the interface 24 or via a further interface and to configure it, for example.

FIG. 2 shows in the upper part for the explanation of the functional principle of the event-based image sensor 20 a purely exemplary temporal intensity development in a pixel element of the image sensor 20. A conventional image sensor would integrate this intensity development over a predefined exposure time window; the integrated values of all the pixel elements would be output in the cycle of a predefined frame rate and then reset for the next frame.

The pixel element of the event-based image sensor 20 instead reacts to an intensity change individually and independently of a frame rate. Points in time at which an intensity change was found are respectively marked by perpendicular lines. Events at these points in time are shown in the lower part of FIG. 2 with plus and minus in dependence on the direction of the intensity change. It is conceivable that the pixel element does not react to any and all intensity changes, but only when a certain threshold has been exceeded. The advanced demand can be made that the threshold is exceeded within a certain time window. Comparison values of prior intensities outside the time window are then so-to-say forgotten. A pixel element can advantageously already be individually configured, at least roughly, for the recognition of flashes by the threshold and/or time window.

The events generated by a pixel element are read out individually at the time of the event or preferably in readout cycles of the duration dt and thus transferred to the control and evaluation unit 22. In this respect, the time resolution is in no way restricted to dt since the pixel element can provide the respective event with any desired fine time stamp. The cycles fixed by dt are also otherwise not to be compared with a conventional frame rate. A higher frame rate conventionally means a data amount scaled up directly linearly by the additional images. With the event-based image sensor 20, the data amount to be transmitted does not depend on dt except for a certain administration overhead. If namely dt is selected as shorter, fewer events are also to be processed per readout cycle. The data amount is determined by the number of events and is thus largely independent of dt.

There are also integrating event-based cameras in addition to differential event-based cameras. They react in a very analogous manner to intensity changes. Instead of outputting the direction of the intensity change, however, the incident light is integrated in a time window predefined by the event. A gray value is thereby produced. Differential and integrating event-based cameras have a different hardware design and the differential event-based camera is faster since it does not require any integration time window. Reference is additionally made again to the patent literature and scientific literature named in the introduction with reference to the technology of an event-based camera.

The image information of the event-based image sensor 20 is not an image, but an event list. A respective event is, for example, output as a tuple having the sign of the intensity change with a differential event-based camera or with a gray value with an integrating event-based camera, the pixel position on the image sensor 20 in the X and Y directions and a time stamp. If only a binary decision is to be made whether a flash 14 has occurred in a respective readout cycle dt or not, the output or processing of the pixel position can be dispensed with. A time stamp is not necessary when the readout cycle dt is small enough in comparison with the duration of a flash. The polarity or intensity of the event enables a more accurate evaluation, as still explained, but flashes can already be recognized solely from the number of events. No date of the exemplary tuple is thus absolutely necessary and the representation of an event can be selected in dependence on the embodiment, up to the mere binary detection that an event has occurred or on the counting of events during a readout cycle.

A pixel element that does not register any event in a readout cycle does not contribute to the event list and does not have to be read. It would be conceivable in principle to reconstruct an image from the event list in that the events are entered into a matrix with X-Y positions corresponding to the positions of the pixel elements on the image sensor 20. In accordance with the invention, this intermediate step is, however, preferably dispensed with; the evaluation then remains independent of images or completely on the level of events. This very considerably reduces the data to be processed because events generated by flashes are very rare and thus most pixel elements do not generate any image information to be processed at most times.

FIG. 3 shows an exemplary image of a flash that was recorded from the events of the event-based image sensor 20. This image solely serves for illustration and for understanding since, as mentioned multiple times, the flash recognition preferably actually does not take place on the basis of an image, but rather directly evaluates the events. An image as in FIG. 3 could therefore be generated from the events, but this is preferably not done, or at best in a supplementary manner, for example for diagnostic purposes or for evaluations additional to the flash recognition.

The image shown in FIG. 3 is therefore preferably actually not built up and evaluated for the flash recognition. The event-based image sensor 20 rather generates a continuous data flow of the events individually integrated in the pixel elements. The continuous data flow can equally be continuously transferred to the control and evaluation unit 22. Data packets are preferably instead transmitted cyclically in readout cycles of a duration dt. The duration dt of a readout cycle is in principle freely selectable, but should be adapted to the short duration of a flash and should therefore remain small, for example at most 1 ms or at most 100 μs. If the events bear a time stamp, slower readout cycles can be selected since the time association can then still satisfy the time scales of a flash with reference to the time stamp. An evaluation cycle of the control and evaluation unit 22 preferably follows every readout cycle. In principle, the evaluation cycles could also be slower, for example with a period duration k*dt, where k is a small natural number.

FIG. 4 shows an exemplary representation of the number of events in dependence on the time over a phase with a flash. Events are each counted over a readout cycle of 100 μs. The steeply rising flank on the occurrence of the flash can be clearly recognized. The decay then extends over a somewhat longer duration that is still very short in absolute terms.

It is advantageous to clean up the event list in advance of the actual flash recognition. An optional processing step reduces the noise, the filtering of spontaneous events that have nothing to do with the flash. It can be recognized in FIGS. 3 and 4 that corresponding image noise practically does not occur there. For example, a stronger image noise is, however, possible under a different extraneous light load.

In contrast to a flash, binary noise occurs in time and space isolation. An exemplary filter can therefore check for a respective event whether there are simultaneous events in the neighborhood. At the same time, the duration dt or a multiple thereof is defined via a time window, for example. The neighborhood relates to the position of the respective pixel element triggering the event, with a maximum distance of one or a few pixels being required, i.e., for example, a neighborhood 4 of the direct neighbors or a 3×3 window. Simultaneous events will not be found in the neighborhood or at least no more than a maximum number of very few such events for spontaneous isolated events independently of a flash. Isolated single events can thereby be recognized and discarded. It is not necessary to convert the events into an image for the check whether there are further events in the neighborhood. Instead, a search can be made in the list for further events with the same pixel coordinates within the tolerance specified by the neighborhood.

A further optional preprocessing step distinguishes whether it has become lighter or darker on the respective event. This can be decided using the sign ±1 of the event or its polarity so that the preprocessing step is also called a polarity filter. Single event filters and polarity filters can be used individually, together, or not at all depending on the embodiment.

FIG. 5 shows the representation of the number of positive events in dependence on the time over a phase with a flash in dependence on FIG. 4 after applying a polarity filter. Only events with a sign +1 remain in which it has therefore become lighter, the flash has appeared. The polarity filter has eliminated the event with a sign −1 in which it has become darker, the flash thus decays. The event-based image sensor 20 reacts very fast to the occurrence of the flash, but with somewhat of a delay to its disappearance. The events remaining after the polarity filter are therefore localized more in time and can be evaluated with greater accuracy and more simply. This is easy to track with the naked eye; the peak in FIG. 5 is even clearer and more distinct than the peak in FIG. 4.

The peak corresponding to the flash can now be recognized for a minimum number of events, for example by a threshold shown as a dashed line. The threshold is set here by way of example at 200 events. It is only important in principle that the threshold is high enough that it is not exceeded by still remaining noise events and does not require more events than a flash triggers. As can be recognized in FIG. 5, there is a great deal of leeway for this purpose; a threshold at 100 or 400 would work just as well. Other algorithms known per se can naturally also be used to recognize and localize a peak.

FIG. 6 shows the X and Y positions of a recognized flash as a function of time. The time of the flash is known from the time position of the peak. The flash can, however, also be spatially localized. The events contributing to the peak each occurred at a specific position on the image sensor 20. A list of X-Y positions of the pixel elements detecting the flash is thus present in the events of the peak. They can already localize the flash directly as a point cloud, in particular in a visualization, for example for diagnostic purposes. The individual X-Y positions can moreover be combined to a flash position, for example as a focus or mean value. A further, non-exclusive possibility is an envelope around the X-Y positions.

A flash has only been recognized in the time window of the peak of FIG. 5 in FIG. 6; the recognized X and Y positions in FIG. 6 therefore run at different times on the base line. The resulting X and Y positions are shown by dashed and solid lines in the time window of the peak. FIG. 6 should illustrate the procedure and the time relationship with respect to FIGS. 4 and 5. The flash position could be shown more intuitively, for example in that the flash position is emphasized corresponding to the pixel elements on an X-Y matrix. They are, however, steps downstream of the flash recognition for a further diagnosis and planning of the possible response to a flash.

The total flash recognition does not require the conversion of the events into an image at any time. Work can take place continuously on the level of events or event lists. The data amount is very substantially reduced with respect to the evaluation of images. A real time capable flash recognition can thereby also be implemented without overdimensioned processor hardware.

The invention claimed is:

1. A camera for recognizing flashes, comprising:

an image sensor having a plurality of pixel elements to generate image information; and a control and evaluation unit that is configured to read and evaluate the image information from the image sensor as to whether a flash has been detected by the image information, wherein the image sensor is an event-based image sensor, wherein the control and evaluation unit is configured to read and evaluate events as image information, and wherein the control and evaluation unit is further configured to evaluate the events themselves to determine if the flash was detected without assembling an image therefrom.

2. The camera in accordance with claim 1, wherein the control and evaluation unit is configured to recognize the flash as a minimum number of events within a maximum time.

3. The camera in accordance with claim 2, wherein the minimum number of events is a minimum number of local events.

4. The camera in accordance with claim 1, wherein the image sensor generates image information at an updating frequency of at least one KHz.

5. The camera in accordance with claim 1, wherein a respective pixel element determines when the intensity detected by the pixel element changes and generates an event exactly then.

6. The camera in accordance with claim 5, wherein the event has differential information whether the intensity has decreased or increased.

7. The camera in accordance with claim 1, wherein an event respectively has coordinate information of the associated pixel element, time information, and/ or intensity information.

8. The camera in accordance with claim 1, wherein the pixel elements are formed or configured such that an event is only generated at a high contrast difference corresponding to the flash.

9. The camera in accordance with claim 1, wherein the control and evaluation unit is configured only to further evaluate events of increasing intensity.

10. The camera in accordance with claim 1, wherein the control and evaluation unit is configured to discard spatially isolated events, with an event being spatially isolated when too few further events occur in a neighborhood of the event during a maximum time.

11. The camera in accordance with claim 10, wherein the event is spatially isolated when no further events at all occur in a neighborhood of the event during a maximum time.

12. The camera in accordance with claim 1, wherein the control and evaluation unit is configured to compare a number of events occurring during a maximum time with a threshold value and to recognize the flash on an exceeding of the threshold value.

13. The camera in accordance with claim 1, wherein the control and evaluation unit is configured only to associate events within a part zone of a detection zone of the camera with a possible recognized flash.

14. The camera in accordance with claim 1, wherein the control and evaluation unit is configured to determine a location of the flash from the events in which the flash is recognized.

15. The camera in accordance with claim 14, wherein the control and evaluation unit is configured to determine a location of the flash from the events in which the flash is recognized as a mean value, an envelope, or a point cloud of the positions of the pixel elements corresponding to the events.

16. A method of recognizing flashes, comprising:

generating image information using an image sensor having a plurality of pixel elements; and reading and evaluating the image information from the image sensor as to whether a flash has been detected with the image information, wherein the image sensor is an event-based image sensor, wherein events are read and evaluated as image information, and wherein the events themselves are evaluated to determine if the flash was detected without assembling an image therefrom.

17. The camera in accordance with claim 1, wherein the image sensor generates image information at an updating frequency of at least ten KHz.

18. A camera for recognizing flashes, comprising:

an image sensor having a plurality of pixel elements to generate image information; and a control and evaluation unit that is configured to read and evaluate the image information from the image sensor as to whether a flash has been detected by the image information, wherein the image sensor is an event-based image sensor, wherein the control and evaluation unit is configured to read and evaluate events as image information, and wherein the control and evaluation unit is configured only to further evaluate events of increasing intensity.

*     *     *     *     *